(12) United States Patent
Bickford et al.

(10) Patent No.: US 9,152,168 B2
(45) Date of Patent: Oct. 6, 2015

(54) SYSTEMS AND METHODS FOR SYSTEM POWER ESTIMATION

(75) Inventors: Jeanne P. Bickford, Essex Junction, VT (US); Rebecca A. Bickford, Essex Junction, VT (US); Susan K. Lichtensteiger, Essex Junction, VT (US); Jeanne H. Raymond, Richmond, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 417 days.

(21) Appl. No.: 13/605,050

(22) Filed: Sep. 6, 2012

(65) Prior Publication Data

US 2014/0068283 A1 Mar. 6, 2014

(51) Int. Cl.
*G06F 17/50* (2006.01)
*G06F 1/00* (2006.01)

(52) U.S. Cl.
CPC ........................................ *G06F 1/00* (2013.01)

(58) Field of Classification Search
CPC .................................................. G06F 2217/12
USPC .................... 716/54, 106, 109, 111, 120, 133
See application file for complete search history.

(56) References Cited

U.S. PATENT DOCUMENTS

| | | | |
|---|---|---|---|
| 6,792,582 B1 * | 9/2004 | Cohn et al. ..................... 716/120 |
| 7,363,176 B2 | 4/2008 | Patel et al. | |
| 7,475,366 B2 | 1/2009 | Kuemerle et al. | |
| 8,141,012 B2 | 3/2012 | Buck et al. | |
| 8,249,819 B1 * | 8/2012 | Treichler et al. ................. 702/57 |
| 2006/0080076 A1 | 4/2006 | Lahiri et al. | |
| 2008/0034337 A1 | 2/2008 | Kuemerle et al. | |
| 2008/0189064 A1 * | 8/2008 | Yamaguchi et al. ............ 702/69 |
| 2009/0228843 A1 | 9/2009 | Anemikos et al. | |
| 2010/0293512 A1 * | 11/2010 | Buck et al. ......................... 716/2 |
| 2011/0106497 A1 * | 5/2011 | Visweswariah et al. ....... 702/182 |
| 2011/0309553 A1 * | 12/2011 | Huff .............................. 264/400 |
| 2014/0039664 A1 * | 2/2014 | Anemikos et al. ............ 700/121 |

OTHER PUBLICATIONS

Buck et al., "Statistical Timing: Where's the Tofu?" International Conference on Computer-Aided Design (ICCAD), Nov. 2009, 26 pages.
Field et al., "Cell Binning Method Analysis to Minimize Mismatch Losses and Performance Variation in Si-Based Modules", Photovoltaic Specialists Conference, IEEE 2002, pp. 418-421.
Shen et al., "A New Voltage Binning Technique for Yield Improvement Based on Graph Theory", 13th International Symposium on Quality Electronics Design, IEEE 2012, 6 pages.
Zolotov et al., "Voltage Binning Under Process Variation", 2009 IEEE/AMC International Conference on Computer-Aided Design Digest of Technical Papers, Nov. 2009, pp. 425-432.

\* cited by examiner

*Primary Examiner* — Paul Dinh
(74) *Attorney, Agent, or Firm* — David Cain; Roberts Mlotkowski Safran & Cole, P.C.

(57) ABSTRACT

Methods and systems for system power estimation are provided. A method implemented in a computer infrastructure includes separating products into different segments. The method also includes calculating a power estimation for each segment based on operating conditions of each respective segment. The method further includes calculating an average system power estimation. At least one of the separating, calculating the power estimation, and calculating the average system power estimation is performed using a processor.

14 Claims, 5 Drawing Sheets

| 16 Bins (Segments) |
|---|
| 0.298% |
| 0.789% |
| 1.817% |
| 3.641% |
| 6.349% |
| 9.633% |
| 12.720% |
| 14.617% |
| 14.617% |
| 12.720% |
| 9.633% |
| 6.349% |
| 3.641% |
| 1.817% |
| 0.789% |
| 0.298% |

Redistribute applying % screened to other bins

| 6 Bin Screens |
|---|
| ----- |
| ----- |
| ----- |
| ----- |
| ----- |
| ----- |
| 16.422% |
| 18.871% |
| 18.871% |
| 16.422% |
| 12.436% |
| 8.197% |
| 4.701% |
| 2.346% |
| 1.019% |
| 0.385% |

SYSTEMS AND METHODS FOR SYSTEM POWER ESTIMATION

FIELD OF THE INVENTION

The invention relates to semiconductor devices and, more particularly, to systems and methods for system power estimation.

BACKGROUND OF THE INVENTION

Power consumption from integrated circuits using electronic devices includes two types of power: (i) dynamic power consumption; and (ii) and static, i.e., leakage, power consumption. Dynamic power consumption is the power required to operate (i.e., switch) a device; whereas, static power consumption refers to the power consumed by the device when it is not operating. As the dimensions in a technology decrease, the static power of devices increases, and as a result, the overall power consumption also increases. Thus, in fabrication processes, it is important to estimate the power of integrated circuits.

Current power estimations of integrated circuits are based on worst case scenarios. More specifically, use of worst case scenarios assume worst case system operating conditions for all products, e.g., integrated circuits. However, power is different for slower products and faster products. For example, in selective voltage binning (SVB) systems, a lower operating voltage is required for faster parts and a higher operating voltage is required for slower parts, and the power is determined based on the operating voltage of the products. As a result, system power estimations do not accurately reflect the power of all of the products because the products operate at different voltages. For SVB and non-SVB systems, ENERGY STAR® requires an accurate overall power estimation. More specifically, ENERGY STAR® input requires an "average" power estimation or "expected power" estimation. (ENERGY STAR is a registered trademark of the United States Environmental Protection Agency). However, current power estimations are not capable of providing accurate average system power estimations.

Accordingly, there exists a need in the art to overcome the deficiencies and limitations described hereinabove.

SUMMARY OF THE INVENTION

In a first aspect of the invention, a method implemented in a computer infrastructure comprises separating products into different segments. The method also comprises calculating a power estimation for each segment based on operating conditions of each respective segment. The method further comprises calculating an average system power estimation. At least one of the separating, calculating the power estimation, and calculating the average system power estimation is performed using a processor.

In another aspect of the invention, a computer program product comprising a computer readable storage memory device having readable program code embodied in the computer readable storage memory device is provided. The computer readable program, when executed on a computing device, is operable to cause the computing device to divide a manufacturing process window into segments based on an applied planned manufacturing distribution. The computer readable program also causes the computing device to calculate an expected amount of product in each of the segments, wherein the expected amount is a distribution percentage. The computer readable program further causes the computing device to calculate a power estimation for each segment based on operating conditions of each respective segment and calculate an average system power estimation.

In yet another aspect of the invention, a computer system for calculating an average system power estimation comprises a CPU, a computer readable memory and a tangible computer readable storage media. The computer system comprises first program instructions to divide a manufacturing process window into segments based on an applied planned manufacturing distribution. The computer system also includes second program instructions to calculate an expected amount of product in each of the segments, wherein the expected amount is a distribution percentage. The computer system further includes third program instructions to calculate a power estimation for each segment based on operating conditions of each respective segment, and fourth program instructions to calculate an average system power estimation. The calculating the average system power estimation comprises calculating a power for each segment by multiplying the distribution percentage for each segment by the power estimation calculated for each segment and summing the power for each segment. The first, second, third, and fourth program instructions are stored on the computer readable storage media for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
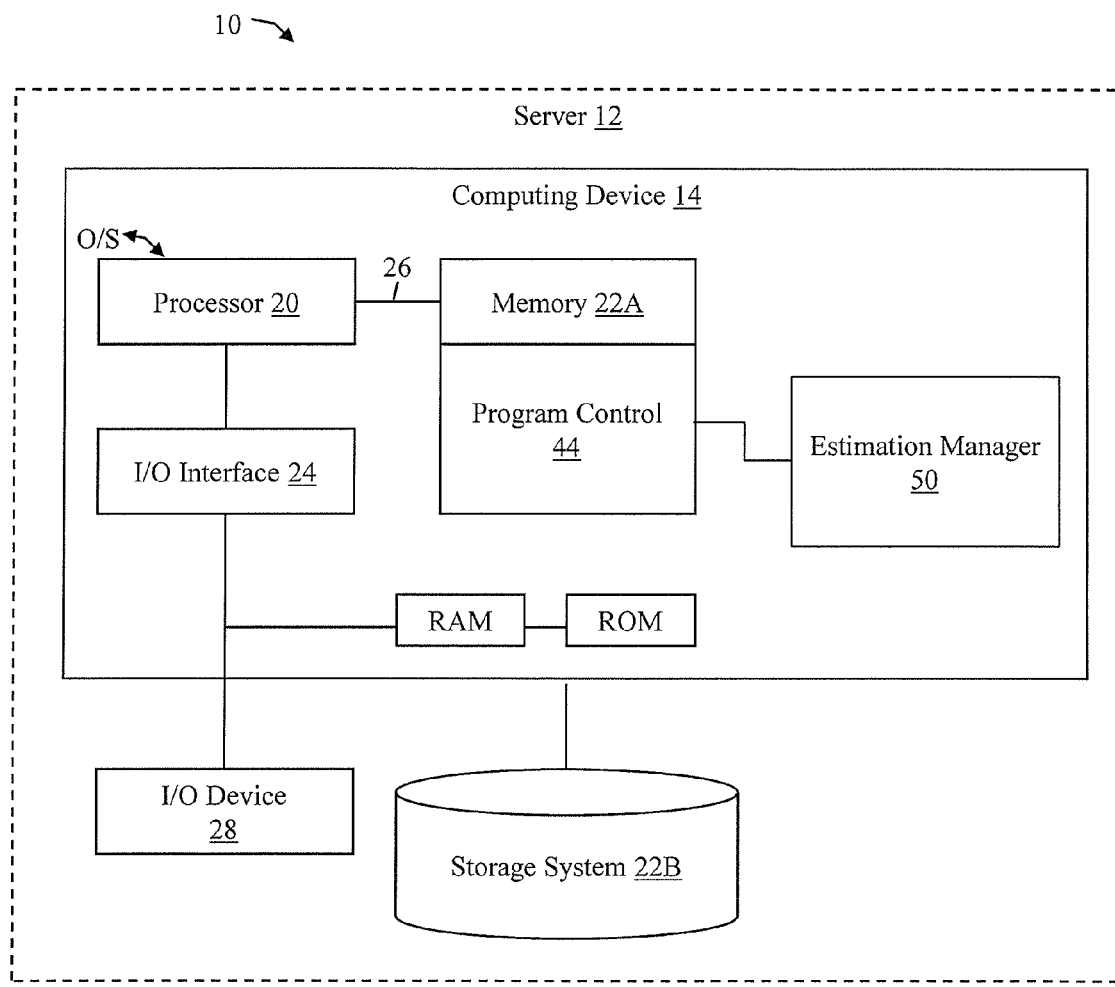
FIG. 1 shows an illustrative environment for implementing steps in accordance with aspects of the present invention.

The invention relates to semiconductor devices and, more particularly, to systems and methods for system power estimation. The present invention advantageously provides for accurate average system power estimations. More specifically, by using a distribution method, the present invention can separate products into different segments and accurately predict a number of products in each segment. Moreover, the present invention can calculate a power estimation for each segment based on the operating conditions of each respective segment and calculate an average system power estimation by summing the estimation for each segment. That is, the present invention provides an accurate system power estimation by determining a power estimation for multiple segments and summing these power estimations for each segment.

More specifically, according to aspects of the present invention, a manufacturing process window can be divided into pre-identified segments. A planned manufacturing distribution, e.g., a Gaussian distribution, is applied to the manufacturing process window and an expected amount of product in each distribution segment, e.g., a distribution percentage, can be calculated. In embodiments of the present invention, the Gaussian distribution curve may be divided into a number of segments, and a subset of the segments may be screened to determine a redistributed Gaussian distribution. Moreover, according to aspects of the present invention, a dynamic power for each segment is calculated using a dynamic power model and a leakage power for each segment is calculated using a leakage power model. The present invention also calculates an average system power. More specifically, the distribution percentage for each segment is multiplied by the power calculated for each segment, and the average system power is calculated by summing the power for each segment.

Additionally, in embodiments of the present invention, selective voltage binning (SVB) can be used to calculate a system power estimation. More specifically, when SVB is used, a system use condition, e.g., a voltage, is identified for each bin. Moreover, a planned manufacturing distribution is applied to the manufacturing process window and an expected amount of product in each distribution segment is calculated, as described above. The present invention can also calculate a power for each segment using a dynamic power model and a leakage power model and a system voltage and calculate an average system power, as described above.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with an external I/O device/resource 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an estimation manager 50 that is configured to perform the processes described herein. The estimation manager 50 can separate manufacturing process windows into pre-identified segments and apply planned manufacturing distributions to calculate an expected amount of product in each segment, e.g., a distribution percentage. Furthermore, the estimation manager 50 can calculate a power for each segment, e.g., a power for each segment using a leakage model for each segment. Moreover, in embodiments, the estimation manager 50 can identify a system use condition, e.g., a voltage, for each pre-identified segment and calculate the system power, e.g., the power, for each segment based on the identified use condition. The estimation manager 50 can also calculate an average system power estimate based on the power value for each segment.

The estimation manager 50 can be implemented as one or more program code in the program control 44 stored in memory 22A as separate or combined modules. Additionally, the estimation manager 50 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
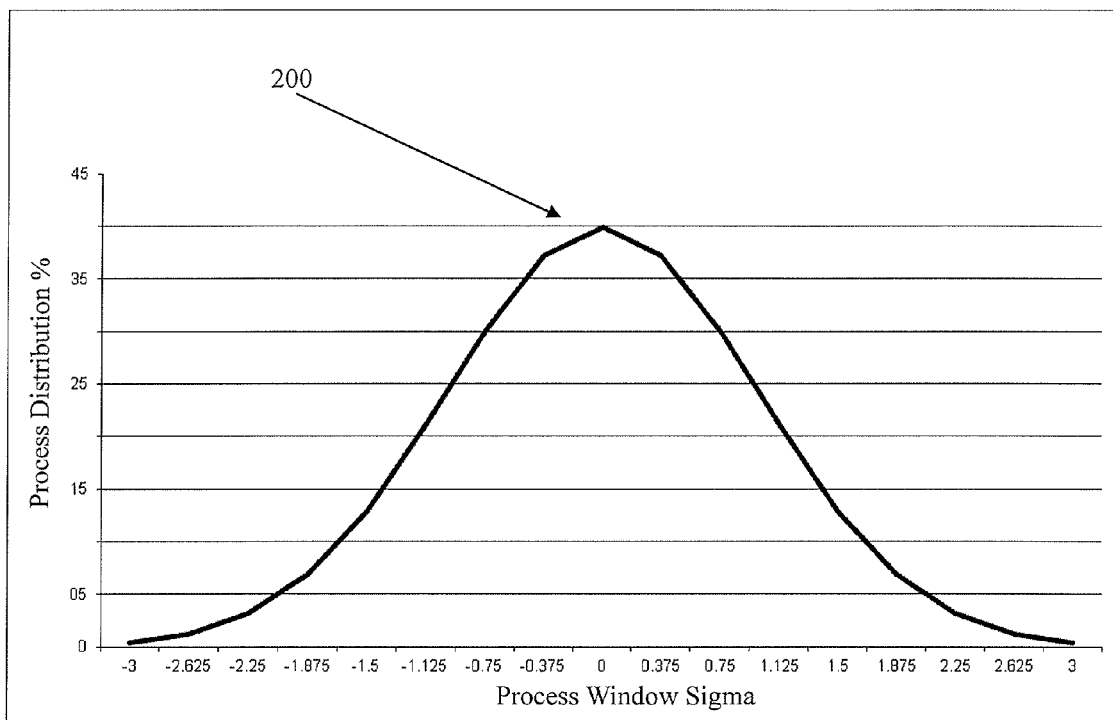
FIG. 2 shows a graph of a Gaussian distribution curve in accordance with aspects of the present invention.

FIG. 2 shows a graph of a Gaussian distribution curve 200 according to aspects of the present invention. In FIG. 2, an x-axis represents a process window sigma and a y-axis represents a process distribution percentage. More specifically, according to aspects of the present invention, the Gaussian distribution curve 200 is used to determine a distribution of products in a manufacturing process. In embodiments, the Gaussian distribution curve 200 is determined using the formula of equation 1.

$$f(x)=(e^{-(x-\mu)^2/2\sigma^2})/(2\pi\sigma^2)^{1/2}, \text{ where } \mu=0, \sigma^2=1 \qquad (1)$$

Although the distribution of products is determined using Gaussian distribution, it is contemplated that alternative distribution methods are also contemplated by the present invention. For example, a histogram of a normal probability curve can be visually analyzed to look for a symmetrical, bell-shaped distribution with no outliers. For larger samples, the histogram can resemble a normal distribution.

Alternatively, a normal probability plot, e.g., a Quantile-Quantile plot, compares sample data against expected values for a normal distribution with a mean and variance of the sample data. The resulting plotted values can be well fitted by a straight line as indicated by a correlation for a line fitted to the plot. In embodiments, statistical tests for a goodness of a line can be used to determine if the correlation is significant and thus suggest agreement with the distribution being normal. Moreover, statistical tools include functions which can be used to produce these plots, fit a line, and determine if the correlation indicates a good fit. In still further embodiments, other statistical goodness of fit tests can be used to determine that a sample of data is drawn from a normal probability distribution. The appropriate usage of these tests varies for different situations and the tests vary in effectiveness based on the sample size. These tests include, but are not limited to, chi-squared tests, the Kolmogorov-Smirnov test, the Lilliefors test, and the Shapiro-Wilk test, all of which are known to those of ordinary skill in the art such that further explanation is not required.

In embodiments, the graph of the Gaussian distribution curve 200 is divided into predefined segments. In this way, a percentage of products in each segment can be determined using the Gaussian distribution curve 200. For example, as shown in Table 1, the Gaussian distribution curve can 200 be divided into 16 segments (also referred to as bins) and a percentage of each product can be determined for each segment. Although Table 1 shows the Gaussian distribution curve 200 divided into 16 bins, the Gaussian distribution curve 200 may be divided into any number of bins because the Gaussian distribution curve 200 is infinitely divisible as should be understood by those of ordinary skill in the art.

TABLE 1

| Bin Number | Percentage of Products |
|---|---|
| 15 | 0.298 |
| 14 | 0.789 |
| 13 | 1.817 |

TABLE 1-continued

| Bin Number | Percentage of Products |
|---|---|
| 12 | 3.641 |
| 11 | 6.349 |
| 10 | 9.633 |
| 9 | 12.72 |
| 8 | 14.617 |
| 7 | 14.617 |
| 6 | 12.72 |
| 5 | 9.633 |
| 4 | 6.349 |
| 3 | 3.641 |
| 2 | 1.817 |
| 1 | 0.789 |
| 0 | 0.298 |

Figures 3, 4:
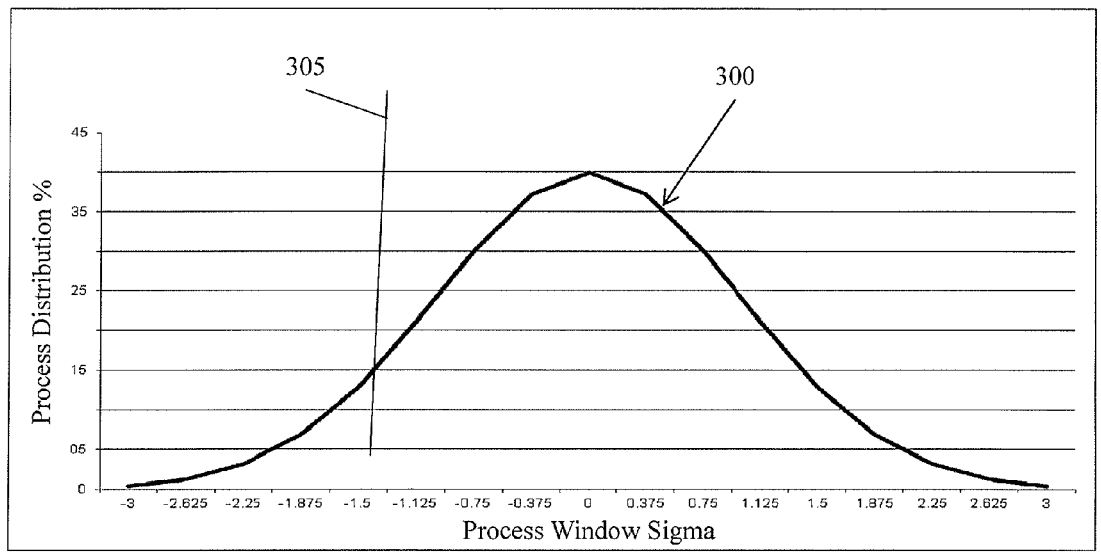
FIG. 3 shows a graph of a Gaussian distribution curve with a screening line in accordance with aspects of the present invention.
FIG. 4 shows an exemplary redistribution of screened segments of the Gaussian distribution curve in accordance with aspects of the present invention.

FIG. 3 shows a graph of a Gaussian distribution curve 300 with a screening line 305 according to aspects of the present invention. In FIG. 3, an x-axis represents a process window sigma and a y-axis represents a process distribution percentage. More specifically, in embodiments, the screening line 305 can be used to screen a performance distribution window of the Gaussian distribution curve of FIG. 2. That is, the screening line 305 can be used to exclude a number of bins from the distribution of products. For example, a screen point, e.g., a screening line, is selected and a ratio multiplier is identified based on the selected screening point. An updated distribution curve is calculated using the ratio multiplier. More specifically, the ratio multiplier and updated Gaussian distribution curve are calculated using the following equations:

$$100\% - (\% \text{ in Screened Bin}) = S(\text{Shipped Distribution}) \quad (2);$$

$$100\%/S = R_m(\text{ratio multiplier}) \quad (3); \text{ and}$$

$$\text{Update expected value based} = \text{Bin value} \times R_m \quad (4).$$

FIG. 4 shows an exemplary redistribution of screened segments in accordance with aspects of the present invention. More specifically, products in screened segments are redistributed into all remaining segments using equations (2)-(4). For example, as shown in FIG. 4, six segments are screened and the percentage of products in the remaining segments can be updated. More specifically, in embodiments, the percentage of products in the screened segments is 22.527%, and as such, S=77.473% (e.g., 100%−22.527%) and $R_m$=1.291 (e.g., 100%/77.473%), as calculated using equations (2) and (3), respectively. Accordingly, the percentage of products in the remaining segments can be updated by multiplying the percentage of products in the remaining segments by 1.291. For example, as shown in FIG. 4, a percentage of products in a last segment, i.e., bin 16, increases from 0.298% to 0.385%, e.g., 0.298%×1.291. Although FIG. 4 shows the Gaussian distribution curve divided into 16 bins with 6 bins being screened, it is contemplated that the Gaussian distribution curve may be divided into any number of bins and that any number of bins may be screened in accordance with aspects of the present invention.

Flow Diagrams

Figure 5:
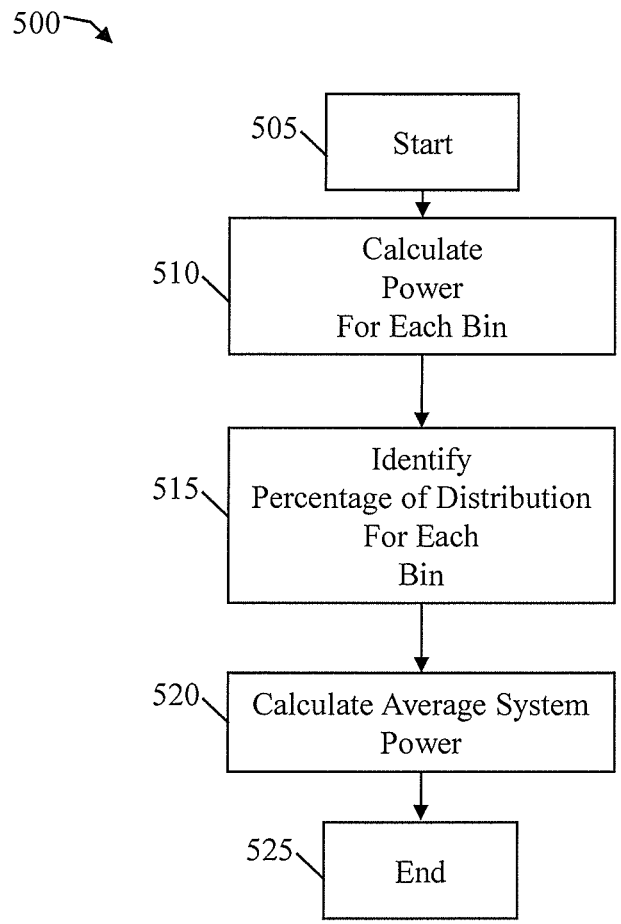
FIGS. 5 and 6 show exemplary flow charts for performing aspects of the present invention.
Figure 6:
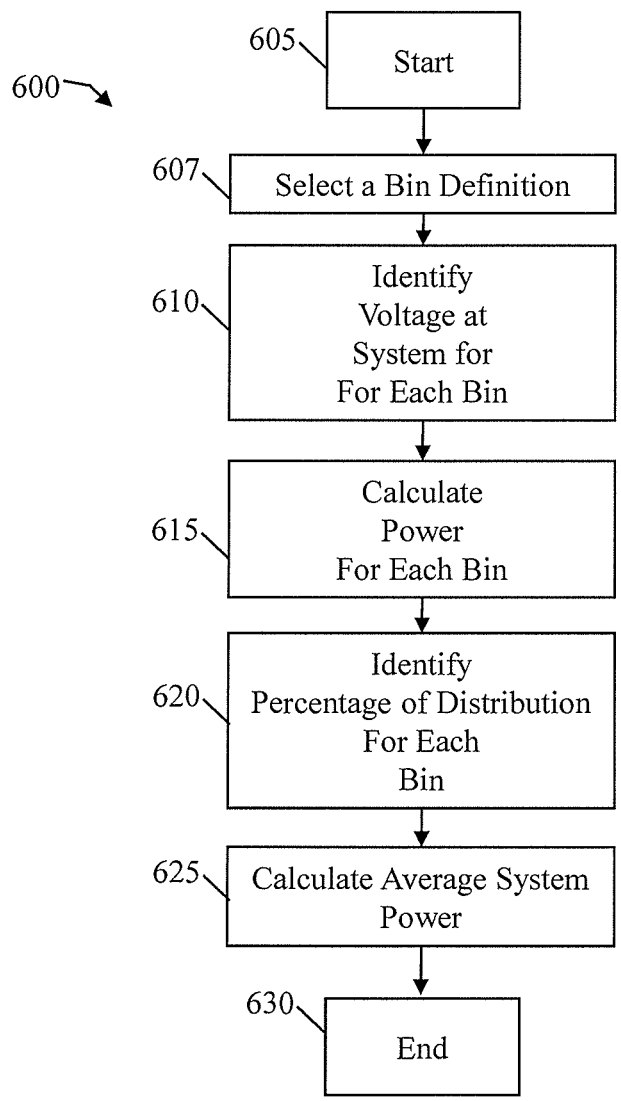

FIGS. 5 and 6 show exemplary flows for performing aspects of the present invention. The steps of FIGS. 5 and 6 may be implemented in the environment of FIG. 1, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow for a process in accordance with aspects of the present invention. As shown in FIG. 5, at step 505, the process of the invention begins. At step 510, the process includes calculating a dynamic power and a leakage power for each bin. In embodiments, the leakage power for each bin is calculated using a leakage-model for each segment. More specifically, the leakage power is calculated by determining technology reference process, voltage, and temperature (PVT) leakage currents. The leakage currents can then be used to determine a cell leakage of a semiconductor device as should be understood by those of ordinary skill in the art. Voltage is a major factor in leakage currents and dynamic power, as should be understood by those of ordinary skill in the art. In embodiments, the dynamic power is calculated in accordance with equation (5):

$$\text{Dynamic Power} = C_{eff} V^2 F \quad (5).$$

$C_{eff}$ is equal to an effective capacitance, which is a function of voltage and temperature, V is equal to an operating voltage of the bin, and F is equal to a switching frequency of the product in the bin. In embodiments, a single capacitance is used to calculate the power of all of the bins.

The process further includes identifying the distribution percentage for each segment, at step 515. More specifically, as discussed herein, the distribution for each segment may be based on a Gaussian distribution curve, which can be divided into any number of segments. Alternatively, the Gaussian distribution curve may be divided into a number of segments, and a subset of the segments may be screened to determine a redistributed Gaussian distribution. At step 520, a system power is calculated. More specifically, the distribution percentage for each segment is multiplied by the power calculated at step 510 to determine a bin power for each segment, and the average system power is calculated by summing the bin powers. At step 525, the process ends.

As should be understood by those of ordinary skill in the art, the present invention contemplates calculating system power estimation, and the present invention is described as calculating the system power; however, it should be understood that any system parameter may be calculated, without departing from the scope of the present invention. More specifically, although the present invention is described in the context of system power, it should be understood that any known parameter, e.g., a threshold voltage, a drain current or a drain to source current, or a current in a linear region of a transistor (e.g., n-channel FET or p-channel FET), can determined using the processes described herein.

FIG. 6 depicts an exemplary flow for a process in accordance with aspects of the present invention. As shown in FIG. 6, at step 605, the process of the invention begins. The process includes, at step 607, selecting a bin definition as already known by those of ordinary skill in the art and disclosed in, for example, U.S. Pat. No. 7,475,336 and U.S. Pat. No. 8,141,012, the contents of which are incorporated by reference herein in their entirety. At step 610, the process includes identifying an operation voltage for each bin. More specifically, in selective voltage binning (SVB), products operating at slower frequencies require higher operating voltages; whereas, products operating at higher frequencies require lower operating voltages in order to maintain a consistent product performance requirement as should be understood by those of ordinary skill in the art. In this way, according to aspects of the present invention, a lower power estimation can be achieved by using the lowest voltage for each respective bin that meets product performance requirements. As a result, the Gaussian distribution curve can be divided into any number of bins, as described herein, and an operating voltage for each bin can be determined in accordance with SVB. The process also includes calculating a power for each bin, at step 615. In embodiments, the power for each bin is calculated using a leakage-model for each segment and the identified operating voltage for each bin. More specifically, as described herein, the power is calculated by determining technology reference process, voltage, and temperature (PVT) leakage currents. The leakage currents can then be used to determine a cell leakage of a semiconductor device as should be understood by those of ordinary skill in the art. In embodiments, the dynamic power is calculated in accordance with equation (5).

The process further includes identifying the distribution percentage for each segment, at step 620. More specifically, as discussed herein, the distribution for each segment may be based on a Gaussian distribution curve, which can be divided into any number of segments. Alternatively, the Gaussian distribution curve may be divided into a number of segments, and a subset of the segments may be screened to determine a redistributed Gaussian distribution. At step 625, a system power is calculated. More specifically, the distribution percentage for each segment is multiplied by the power calculated at step 615 to determine a bin power for each segment, and the average system power is calculated by summing the bin powers. At step 630, the process ends.

As should be understood by those of ordinary skill in the art, the present invention contemplates calculating system power estimation, and the present invention is described as calculating the system power; however, it should be understood that any system parameter may be calculated, without departing from the scope of the present invention. More specifically, although the present invention is described in the context of system power, it should be understood that any known parameter, e.g., a threshold voltage, a drain current or a drain to source current, or a current in a linear region of a transistor (e.g., n-channel FET or p-channel FET), can determined using the processes described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented in a computer infrastructure, the method comprising:
   separating products into different segments based on a manufacturing distribution of the products applied to a manufacturing process window;
   calculating a power estimation for each segment based on operating conditions of each respective segment; and
   calculating an average system power estimation for a plurality of the segments, wherein at least one of the separating, calculating the power estimation, and calculating the average system power estimation is performed using a processor,
   wherein the calculating of the power estimation for each segment and the calculating of the average power estimation are used to manufacture electronic circuit elements,
   wherein the separating the products into different segments comprises:
      dividing the manufacturing process window into the segments based on the manufacturing distribution; and
      calculating an expected amount of product in each of the segments, wherein the expected amount is a distribution percentage, and
   wherein the calculating the average system power estimation comprises:
      calculating a power for each segment by multiplying the distribution percentage for each segment by the power estimation calculated for each segment; and
      summing the power for each segment.

2. The method of claim 1, wherein the manufacturing distribution is a Gaussian distribution curve.

3. The method of claim 2, further comprising:
   screening a subset of the segments; and
   determining a redistributed Gaussian distribution curve.

4. The method of claim 3, wherein the determining the redistributed Gaussian distribution curve comprises:
   calculating a ratio multiplier based on a selected screening point; and
   updating the Gaussian distribution curve and the distribution percentage using the ratio multiplier.

5. The method of claim 4, wherein:
   the power estimation for each segment is calculated for segments of the redistributed Gaussian distribution; and
   the average system power estimation is based on the segments of the redistributed Gaussian distribution.

6. The method of claim 5, wherein the calculating the average system power comprises:

calculating a power for the segments of the redistributed Gaussian distribution by multiplying the updated distribution percentage by the power estimation calculated for the segments of the redistributed Gaussian distribution; and summing the power for the segments of the redistributed Gaussian distribution.

7. The method of claim 1, further comprising identifying a system use condition for each segment, wherein the power estimation for each segment is based on the operating conditions of each respective segment and the system use condition of each respective segment.

8. A computer program product comprising a computer readable storage memory device having readable program code embodied in the computer readable storage memory device, wherein the computer readable program, when executed on a computing device, is operable to cause the computing device to:

divide a manufacturing process window into segments based on a manufacturing distribution of products applied to the manufacturing process window;

calculate an expected amount of the products in each of the segments, wherein the expected amount is a distribution percentage;

calculate a power estimation for each segment based on operating conditions of each respective segment; and calculate an average system power estimation for a plurality of the segments, wherein the calculation of the power estimation for each segment and the calculation of an average power estimation for plural segments are used to manufacture electronic circuit devices, and the calculating the average system power estimation comprises:

calculating a power for each segment by multiplying the distribution percentage for each segment by the power estimation calculated for each segment; and summing the power for each segment.

9. The computer program product of claim 8, wherein the manufacturing distribution is a Gaussian distribution curve.

10. The computer program product of claim 9, wherein the computer readable program is further is operable to cause the computing device to:

screen a subset of the segments; and calculate a ratio multiplier based on a selected screening point; and update the Gaussian distribution curve and the distribution percentage using the ratio multiplier, wherein:

the power estimation for each segment is calculated for segments of the updated Gaussian distribution, the average system power estimation is based on the segments of the updated Gaussian distribution, and calculating the average system power comprises:

calculating a power for the segments of the updated Gaussian distribution by multiplying the updated distribution percentage by the power estimation calculated for the segments of the updated Gaussian distribution; and summing the power for the segments of the updated Gaussian distribution.

11. The computer program product of claim 9, wherein the computer readable program is further is operable to cause the computing device to:

identify a system use condition for each segment; and calculate the power estimation for each segment based on the operating conditions of each respective segment and the system use condition of each respective segment.

12. A computer system for calculating an average system power estimation, the system comprising:

a CPU, a computer readable memory and a computer readable storage media;

first program instructions to divide a manufacturing process window into segments based on a manufacturing distribution of products applied to the manufacturing process window;

second program instructions to calculate an expected amount of the products in each of the segments, wherein the expected amount is a distribution percentage;

third program instructions to calculate a power estimation for each segment based on operating conditions of each respective segment; and fourth program instructions to calculate the average system power estimation for a plurality of the segments, the calculating the average system power estimation comprising:

calculating a power for each segment by multiplying the distribution percentage for each segment by the power estimation calculated for each segment; and summing the power for each segment, wherein the first, second, third, and fourth program instructions are stored on the computer readable storage media for execution by the CPU via the computer readable memory, wherein the third and fourth program instructions are used to manufacture electronic circuit devices, wherein the manufacturing distribution is a Gaussian distribution curve, further comprising:

fifth program instructions to screen a subset of the segments; and sixth program instructions to calculate a ratio multiplier based on a selected screening point; and seventh program instructions to update the Gaussian distribution curve and the distribution percentage using the ratio multiplier, wherein the power estimation for each segment is calculated for segments of the updated Gaussian distribution; and the average system power estimation is based on the segments of the updated Gaussian distribution.

13. The computer system of claim 12, wherein the calculating the average system power estimation comprises:

calculating a power for the segments of the updated Gaussian distribution by multiplying the updated distribution percentage by the power estimation calculated for the segments of the updated Gaussian distribution; and summing the power for the segments of the updated Gaussian distribution.

14. The computer system of claim 12, further comprising:

eighth program instructions to identify a system use condition for each segment; and sixth program instructions to calculate the power estimation for each segment based on the operating conditions of each respective segment and the system use condition of each respective segment.

* * * * *